United States Patent
Manly et al.

(10) Patent No.: US 7,493,282 B2
(45) Date of Patent: Feb. 17, 2009

(54) SYSTEM AND METHOD FOR AUTOMATED ACCOUNT MANAGEMENT

(75) Inventors: Scott Manly, Chicago, IL (US); Ed Raciak, Lemont, IL (US)

(73) Assignee: Bank of America Corporation, Charlotte, NC (US)

( * ) Notice: Subject to any disclaimer, the term of this patent is extended or adjusted under 35 U.S.C. 154(b) by 971 days.

(21) Appl. No.: 10/392,848

(22) Filed: Mar. 21, 2003

(65) Prior Publication Data

US 2003/0233326 A1    Dec. 18, 2003

Related U.S. Application Data

(60) Provisional application No. 60/387,601, filed on Jun. 12, 2002.

(51) Int. Cl.
G06Q 40/00 (2006.01)
(52) U.S. Cl. .............................. 705/38; 705/39; 705/42
(58) Field of Classification Search ................. 705/38, 705/39, 35, 40, 42, 43
See application file for complete search history.

(56) References Cited

U.S. PATENT DOCUMENTS

| | | | |
|---|---|---|---|
| 4,953,085 A | 8/1990 | Atkins | |
| 5,745,706 A | 4/1998 | Wolfberg et al. | |
| 5,852,811 A | 12/1998 | Atkins | |
| 5,875,437 A | 2/1999 | Atkins | |
| 5,940,813 A * | 8/1999 | Hutchings | 705/43 |
| 6,064,986 A | 5/2000 | Edelman | |
| 6,105,007 A | 8/2000 | Norris | |
| 6,282,523 B1 | 8/2001 | Tedesco et al. | |
| 6,529,885 B1 * | 3/2003 | Johnson | 705/64 |
| 2001/0032180 A1 | 10/2001 | Takami et al. | |
| 2001/0047328 A1 * | 11/2001 | Triola | 705/39 |
| 2002/0026411 A1 * | 2/2002 | Nathans et al. | 705/38 |
| 2002/0029194 A1 * | 3/2002 | Lewis et al. | 705/39 |
| 2002/0095386 A1 | 7/2002 | Maritzen et al. | |
| 2002/0145035 A1 * | 10/2002 | Jones | 235/379 |
| 2002/0161707 A1 | 10/2002 | Cole et al. | |
| 2002/0188564 A1 | 12/2002 | Star | |
| 2002/0188674 A1 | 12/2002 | Brown et al. | |
| 2003/0036987 A1 | 2/2003 | Omiya | |
| 2003/0093371 A1 * | 5/2003 | Wilson | 705/40 |

OTHER PUBLICATIONS

"Chicago Title Enhances Escrow Process With Launch of Escrow Services." Business Wire. New York: Aug. 19, 1999. p. 1.*

* cited by examiner

*Primary Examiner*—Hani M. Kazimi
*Assistant Examiner*—Daniel Kesack
(74) *Attorney, Agent, or Firm*—Banner & Witcoff, Ltd.; Michael A. Springs

(57) ABSTRACT

A system and method of managing bank accounts. A bank receives, electronically, from a customer, instructions to open, to update, to debit/credit, and to close bank accounts, such as escrow accounts associated with real estate transactions. Information in the instructions is used to automatically populate a bank's account management system. New accounts are thereafter automatically established and open accounts are automatically updated and closed consistent with the information in the instructions. New accounts are preferably funded from an operating account belonging to the customer, and checks are caused to be cut in an amount due to a client of the customer, if they so choose.

8 Claims, 13 Drawing Sheets

Customer Profile

| | |
|---|---|
| Customer ID | COLDWLIN ▼ |
| Customer name | Coldwell Banker, Indiana |
| Bank code | 096 ▼    Branch   12345 |
| Officer Code | 012345678    Cost Center   12345 |
| Operating Account | 1234500001 |
| Disbursement Account | 1234567890 |
| Legal title for accts | Client trust acct. r/e escrow |
| Server ID | user |
| Server Pwd | *** |
| Confirm password | *** |

[ Save ]  [ Undo ]  [ Close ]  [ Approve ]

Fig. 2

| | ABN·AMRO SERVICES COMPANY | | | | | CASHPRO WEB | | |
|---|---|---|---|---|---|---|---|---|
| | CASHPRO WEB | | | | | Treasury Management Solutions | | |

| | Account Summary | Trial Balance Report | Approve-Reject Trans | Upload Files | | close | contacts | bulletins | help |
|---|---|---|---|---|---|---|---|---|---|

Escrow

View
View Unapproved Transactions for: 01/22/2002 [filter]

View Records

Select All    Deselect All

| Select | Trans Type | Deal Number | Account Number | Name | Address | Tax ID | Amount | Interest Bearing |
|---|---|---|---|---|---|---|---|---|
| | | | | | | | $11,927.75 | |
| ☑ | Close | 4213000447 | | | | | | |
| ☑ | Update | 4213000452 | | | | | $5,000.00 | Yes |
| ☑ | Open | 4213000457 | | | | | $12,900.00 | Yes |
| ☑ | Open | 4213000458 | | | | | | |
| ☑ | Open | 4213000460 | | | | | $11,250.00 | Yes |
| ☑ | Open | 4213000461 | | | | | $10,600.00 | No |
| ☑ | Open | 4213000464 | | | | | $7,900.00 | Yes |
| ☑ | Open | 4213000490 | | | | | $16,000.00 | No |

Approve Selected

| Account | Name | Tax ID | Address | Date Opened | Date Closed | Deal Number | Current Balance | MTD Interest |
|---|---|---|---|---|---|---|---|---|
| | | | | 01/22/2002 | | 4213000447 | $17,150.00 | $221.77 |
| | | | | 01/22/2002 | | 4213000452 | $7,150.00 | $116.63 |
| | | | | 01/22/2002 | | 4213000457 | $12,900.00 | $217.36 |
| | | | | 01/22/2002 | | 4213000459 | $7,650.00 | $140.47 |
| | | | | 01/22/2002 | | 4213000460 | $11,250.00 | $229.39 |
| | | | | 01/22/2002 | | 4213000461 | $10,600.00 | $241.35 |
| | | | | 01/22/2002 | | 4213000467 | $7,900.00 | $132.76 |
| | | | | 01/22/2002 | | 4213000990 | $16,000.00 | $183.62 |

Total Active Account: 8
Total Funds in Active Accounts: $91,400.00
Operating Account Balance: $227,336.00

ABN-AMRO SERVICES COMPANY
CASHPRO WEB

| Account Summary | Trial Balance Report | Approve-Reject Trans | Upload Files |

CASHPRO WEB
Treasury Management Solutions close   contacts   bulletins   help View
Escrow View Trial Balance for: 01/22/2002  [Filter]

View Results

| Account | Date Opened | Name | Address | Trans. Date | D/C | Amount | Current Balance | MTD Interest | YTD Interest |
|---|---|---|---|---|---|---|---|---|---|
| | 08/02/2000 | | | 01/22/2002 | C | $7,650.00 | $7,650.00 | $140.47 | $0.00 |
| | 08/03/2000 | | | 01/22/2002 | C | $11,250.00 | $11,250.00 | $229.39 | $0.00 |
| | 08/09/2000 | | | 01/22/2002 | C | $10,600.00 | $10,600.00 | $211.35 | $0.00 |
| | 08/25/2000 | | | 01/22/2002 | C | $7,900.00 | $7,900.00 | $132.76 | $0.00 |
| | 09/11/2000 | | | 01/22/2002 | C | $7,450.00 | $7,450.00 | $116.63 | $0.00 |
| | 09/19/2000 | | | 01/22/2002 | C | $12,900.00 | $12,900.00 | $217.36 | $0.00 |
| | 11/10/2000 | | | 01/22/2002 | C | $17,150.00 | $17,150.00 | $221.77 | $0.00 |
| | 11/22/2000 | | | 01/22/2002 | D | $16,163.62 | $0.00 | $0.00 | $0.00 |

Opening Balance Total: $90,900.00
Interest Earned Not Paid: $1,269.73
Year-To-Date Interest: $0.00
Closing Balance Total: $74,900.00

Fig. 9     900

Status page

Day's summary for mm/dd/yyyy

| | |
|---|---|
| Transactions pending approval: | 100 |
| Batches pending approval: | 3 |
| Accounts opened (number/amount deposited) | 4 / $320,000 |
| Accounts closed (number/amout withdrawn) | 15 / $200,000 |
| Operating acct. Avail. balance | $2,000,000 |
| <u>Transaction volume</u> | |
| Total | 50 |
| Processed | 20 |
| Failed | 10 |
| InProcess | 20 |
| Rejected by customer | 1 |

SYSTEM AND METHOD FOR AUTOMATED ACCOUNT MANAGEMENT

This application claims the benefit of U.S. Provisional Application No. 60/387,601, filed Jun. 12, 2002, which is herein incorporated by reference in its entirety.

BACKGROUND

1. Field of the Invention

The present invention relates generally to banking systems and services, and more particularly to systems and methods for facilitating the opening and closing of bulk accounts.

2. Background of the Invention

It is common practice in, e.g., real estate transactions to open, access and close bank accounts, such as escrow. In a fast-paced environment in which several real estate transactions might be closed or settled in a single day, a realty or law office may have to open, access and close several different escrow bank accounts corresponding to the respective transactions. This process requires extensive coordination between a bank and personnel in the realtor's office or law office, requires significant investment in time, and is prone to error due to the manual nature of the process.

More specifically, in the commercial real estate market, real estate companies are often required by law to deposit earnest money, put forth by a buyer, into a segregated account until the day of closing. On a typical day (in a busy season), it is not uncommon for a large commercial real estate office to open or close an average of 100 separate accounts. The annual average aggregate balance of these accounts can reach to the tens of millions of dollars.

Presently, customers (e.g., realtors, title companies) of banks are served through an extremely manual process. Documents with orders/information to open and close accounts are faxed back and forth between the bank and the customer, as well as internally within the bank. Reports are also often faxed to customers on a daily basis. In addition, various groups within the bank must manually input information into the bank's back end legacy systems, i.e., the systems that actually keep track of accounts and balances, to open the requested accounts. To close accounts in accordance with present processes, an agent of the bank must typically fill out several forms and literally stand in line for a teller to cut checks (e.g., for interest that may have accrued). When evaluated at a macro level, current processes roughly require one bank full time employee to open or close 30-40 accounts. Given the number of accounts that may need to be opened and closed in a given day (e.g., 100), this manual account management system quickly becomes too expensive and is not easily scalable (since, among other things, employees must be trained in the intricacies of the process).

The following enumerated steps comprise a typical process in accordance with present day operating procedures. As noted above, these processes are very manual and document intensive, leading to numerous opportunities for manual error. With the current procedures, accounts are opened as follows:

1. Bank accepts faxes/emails from Customers (realtors, law firms, title companies) to open escrow accounts
2. Bank assigns account numbers by placing stickers with account numbers on the fax or printed email and faxes information to other areas of the bank
3. Various groups in the bank enter portions of the data into the bank's back end legacy system and transfer money from the Customer's operating account to the newly created escrow accounts Due to the nature and sequence of the account transactions, the foregoing steps must be generally performed at certain times during the day. Namely, written instructions are received from a Customer by 9 am. Faxes with account numbers are distributed by 10 am. Accounts are opened within the back end legacy systems by noon, and money is transferred to the new escrow accounts at 2 pm. The process proceeds in this lock step fashion throughout the day to give the several banking groups involved enough time to resolve any resource issues. Typically, internal banking groups involved in the process rarely audit or validate any of the information received. The present day procedures have evolved as a means to manually input information into the appropriate back end systems to open and manage bulk accounts.

Typical present day procedures for closing accounts are as follows:

1. Bank accepts faxes or emails from Customers to close accounts
2. Bank agent fills out several forms to close accounts, including:
    a. Form to cut check to end customer (J. Doe) for Interest;
    b. Form to move principal back to Customer's Operating Account; and
    c. Form to close the Account;
3. Bank agent visits a Teller and turns in forms
4. Teller manually closes accounts and cuts checks (as necessary)

As can be appreciated by those skilled in the art, the efficiency of the foregoing procedure is dependant on the speed at which a Bank agent can manually fill out forms and a Teller can process forms. Indeed, it is not uncommon for Bank agents to wait several hours until a Teller becomes available.

In view of the foregoing, there is a need to provide more efficient, cost effective and scalable systems and processes for managing accounts, especially bulk account openings and closings that are often associated with, e.g., real estate transactions.

BRIEF SUMMARY OF THE INVENTION

The present invention provides a secure, automated and cost effective solution for banks to accommodate bulk account customers. The systems and methods described below remove the need for manual intervention within a bank, thereby drastically reducing costs and eliminating capacity issues associated with conventional bulk account management processes. The present invention thus makes it possible for a bank to aggressively pursue large volume customers and provide a competitive solution. The present invention, leverages the availability of online connectivity to create more streamlined access to existing back end systems and thereby enhance and simplify both the customer and internal bank experience. Instead of faxing and printing emails and creating cumbersome paperwork to meet customer needs, the present invention allows for secure, efficient and automated electronic transactions. In a preferred embodiment, the present invention provides for account opening, closing, monetary updates and non-monetary updates (name changes, address changes, etc.) as follows:

1. A user logs onto an internet web site and securely uploads a Batch File with instructions to open, close, perform a monetary update (debit/credit) or a non-monetary update (name, TIN, address, etc.).
2. Optionally, an email notification is sent to an authorizing user indicating that instructions need to be approved.

3. Authorizing user of the same customer/company logs on to the internet web site and approves the transactions (thereby meeting a bank's requirement for dual authorization).
4. Information from the Batch File (or that was manually input) is automatically populated into the bank's back end systems to open, edit, close and/or fund the desired accounts.
5. When necessary (e.g., to pay interest accrued on a closed escrow account), checks may be cut and distributed, consistent with received instructions, The systems and methods of the present invention are, for all intents and purposes, totally automated with the exception of sorting and distributing printed checks. At no point in the inventive process is there manual interaction needed by the bank. The present invention also eliminates the opportunities for manual errors within the bank since, in accordance with the present invention, the bank receives the data uploaded from the customer electronically and automatically populates its back end systems with this data. In addition, the present invention provides more security as the customer must authenticate requested actions through a web site (thereby providing dual approval), whereas under the current regime, a bank might accept an unverified fax and immediately take action.

The present invention also preferably allows customers to view various reports and information through the web site. For example, in a preferred implementation, customers have the ability to print or download reports to another application, such as Microsoft Excel, to manipulate the information as they wish. This is a major improvement over the current process, in which bank personnel must, for example, wait for a Trial Balance report to be generated and delivered from a separate bank department before faxing it to the requesting customer.

As will become even more apparent to those skilled in the art upon a reading of the following detailed description, the present invention makes it possible to, among other things:
 Increase deposits and revenues;
 Allow a bank to aggressively pursue new business with no additional human resources;
 Automate an extremely manual process;
 Reduce internal costs to a bank; and
 Create a dependable and scalable base process.

BRIEF DESCRIPTION OF THE DRAWINGS

FIG. 2 is an exemplary customer profile registry page in accordance with the present invention.

FIGS. 3-11 are exemplary screen shots that, among other things, allow a user to interact with the features of the present invention.

DETAILED DESCRIPTION OF THE INVENTION

Figure 1:
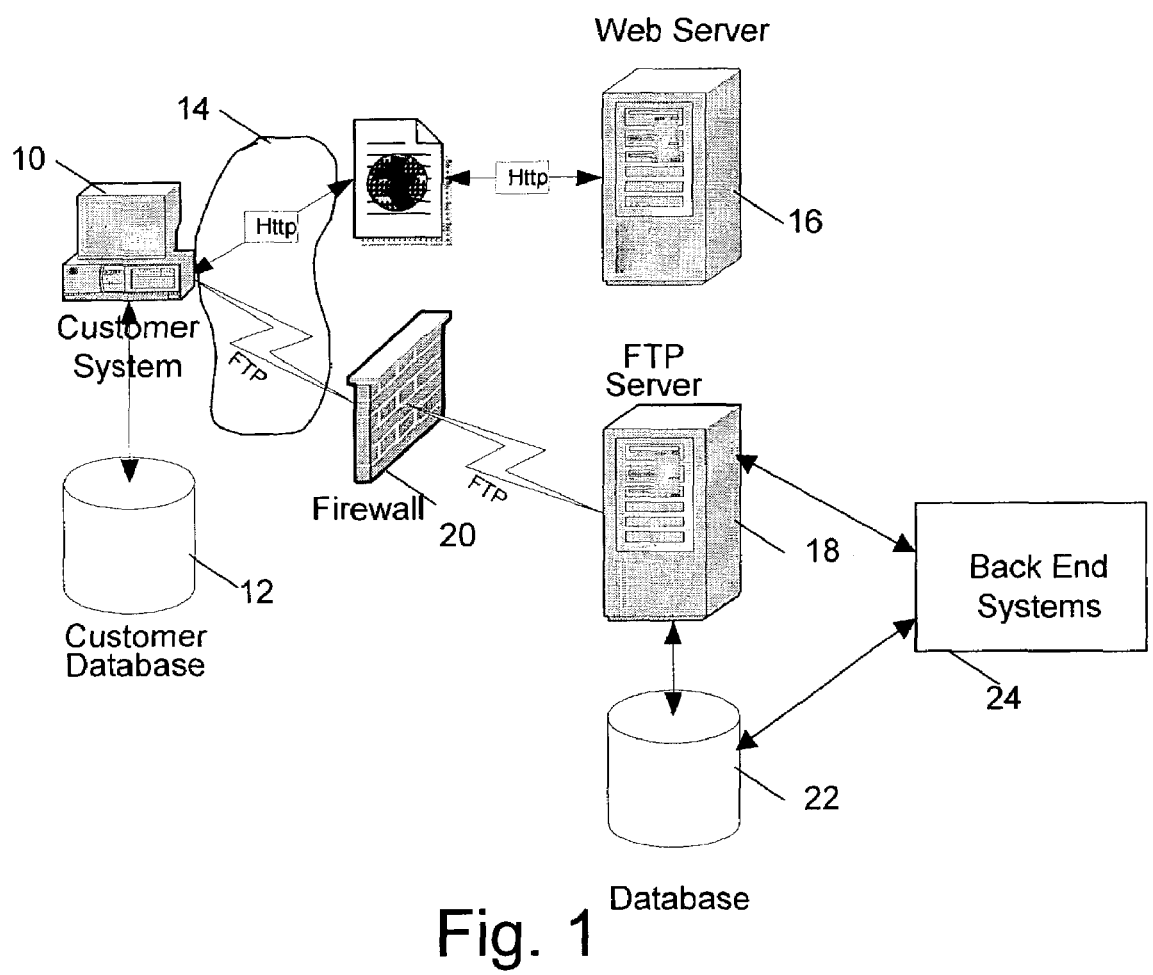
FIG. 1 is a high level schematic diagram of an exemplary implementation of the present invention.

FIG. 1 is a high level schematic diagram of an exemplary implementation of the present invention. A customer and customer computer system 10 is in communication with a customer database 12. Customer database 12 preferably stores a plurality of records, arranged in files, representing accounts to be opened and closed and disbursements to be made. In one possible use of the present invention, the accounts to be opened and closed are escrow accounts associated with real estate transactions. As mentioned previously, there may be on the order of 100 accounts to be opened, updated and/or closed on a given day. (The following description focuses on escrow type accounts, but those skilled in the art will appreciate that any type of bank account could be opened, closed or modified in accordance with the present invention.) These account openings and closings correspond to the initiation of a real estate transaction and the closing of real estate transactions, respectively. In conventional banking operations that handle escrow accounts, it is necessary to assign several people to handle the significant number of account openings and closings. However, the present invention permits customers, via customer system 10 and customer database 12, to automatically interact with a bank and thereby avoid the pitfalls of human error and related inefficiencies.

Referring still to FIG. 1, a bank preferably operates a server 16 that comprises storage means such disk drives, etc. as is well-known in the art. As shown in the figure, customer system 10 can communicates via an electronic network, such as the internet with server 16. As will be explained in more detail below, customer system 10 can access server 16 and interact with the systems and processes in accordance with the present invention. In one aspect of the present invention, after the customer system successfully logs in, customer system 10 uploads a file via using secure HTTP (HTTPS) or file transfer protocol (FTP) to FTP server 16. In the preferred embodiment of the present invention, a firewall 20 is provided to prevent unauthorized access to server 16. Files that are uploaded to server 16 may be stored in the storage means (not shown). Ultimately, information that is uploaded is passed to back end systems 24, such as well known systems that manage accounts, balances and funds transfers. One such well known system is a DDA system.

Preferably, before a customer system 10 is permitted access to the systems and processes of the present invention, a customer profile is established. FIG. 2 depicts an exemplary customer profile registry page that can be used to register customers and thus control access to the systems and processes of the present invention. As shown, a customer profile preferably includes a customer ID, which is a shortened label for a customer's full name. In this case, Coldwell Banker of Indiana is the customer with a representative customer ID of "COLDWLIN." In addition a bank code and branch number are identified to indicate which bank and branch of the bank the customer operates with. Also, an officer code and cost center are provided. Other fields may be added or still others may be deleted depending on the type of information that may necessary or desired to operate a system and method according to the present invention.

Further, the operating account and disbursement account numbers for the customer are provided, as is a legal title (or name) for the accounts. In this case, the accounts are dedicated to client trust accounts for real estate escrows. Finally, the customer profile page of FIG. 2 includes a server ID, as well as a field for a password to allow access to the systems and processes of the present invention. Once a customer's profile has been completed and registered, and the operating and disbursement accounts are available for use (assuming they had not yet been set up before the customer profile had been set up), then customer system 10 will have the ability to communicate fully with server 16 (FIG. 1).

Figure 3:
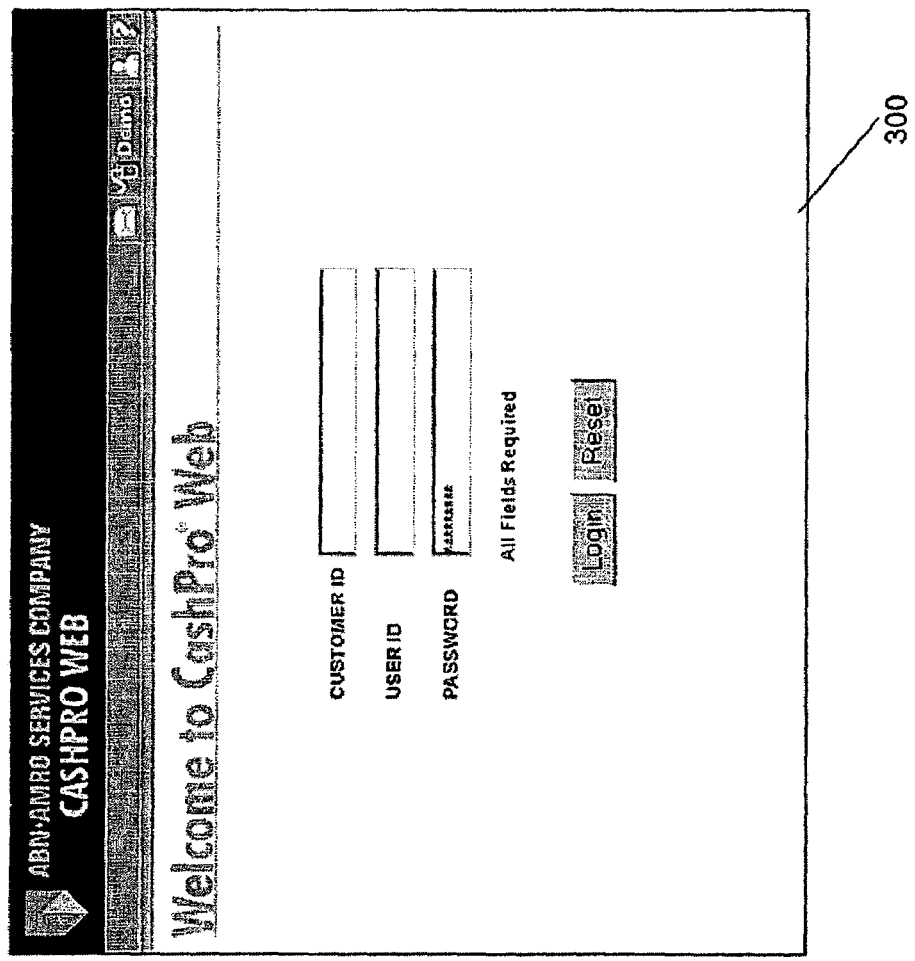
Figure 4:
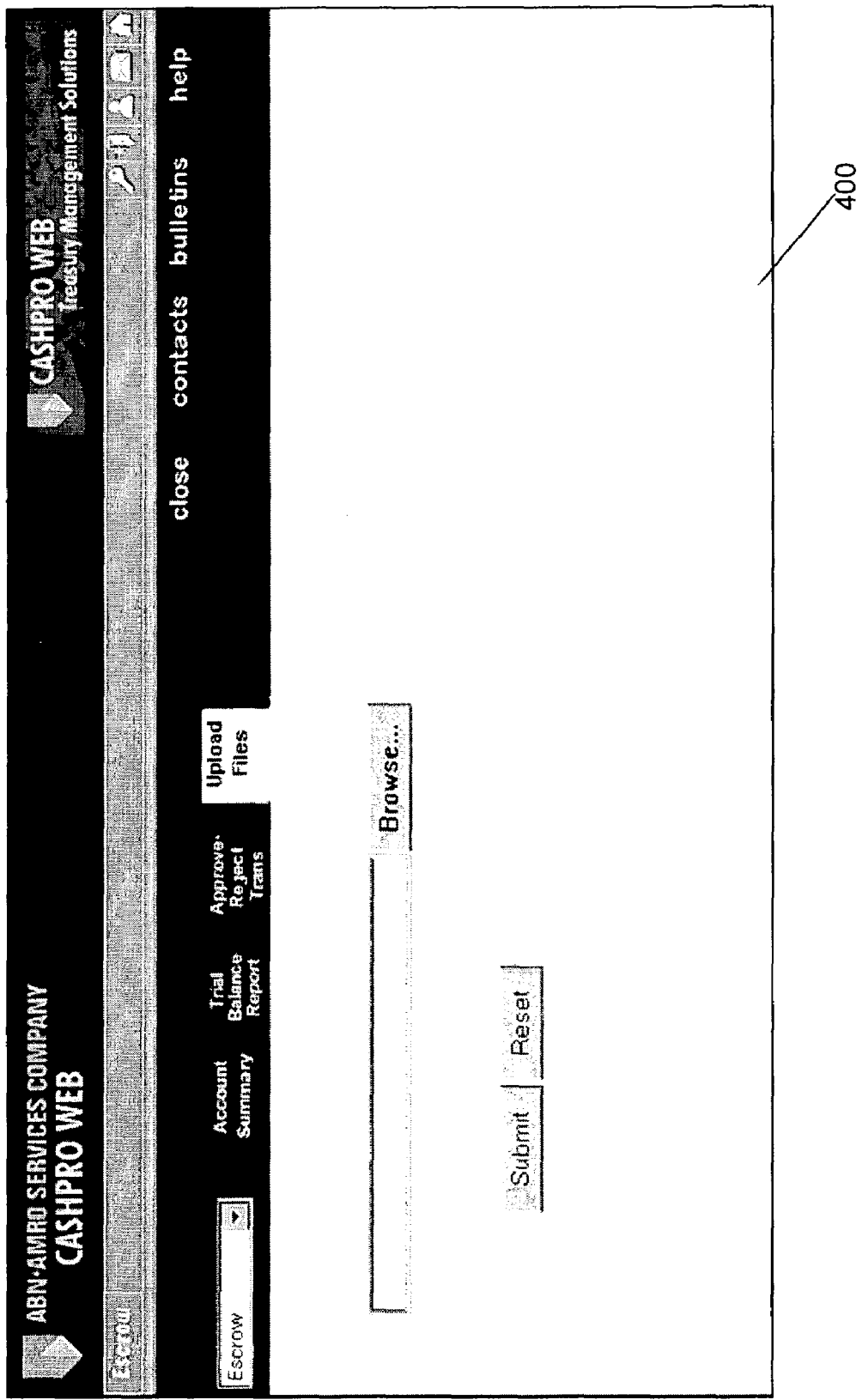

FIGS. 3-11 show a series of exemplary screen shots that are preferably used to interact with the system of the present invention. Referring first to FIG. 3, customer system 10, using a conventional worldwide web browser, accesses a login page 300, served up by server 16, at which a customer ID, user ID and password are entered. By clicking on a login button this information is passed via HTTP (or HTTPS) over, e.g., the internet, to server 16. Upon successful login (i.e., by checking the input information with that received through the registration process exemplified by FIG. 2), screen 400 depicted in FIG. 4 is preferably presented via customer system 10.

Screen 400 is a gateway screen via a which a user can navigate through the several options and features provided by the present invention. The substance of the screen preferably includes data on the number of transaction pending approval, number of batches of files pending approval, the number of accounts and amount deposited, number of accounts closed and the amount withdrawn, balance of the customer's operating account, and information on transaction volume, including a total number, the number processed, the number failed, the number that are InProcess, and the number rejected by the customer. Of course, the type of information presented is not limited to the exemplary types shown in the FIG. 4 or described here, but may also include, for example, the times at which batches were approved, or which user ID was used to upload files.

In addition to the substantive information discussed above, screen 400 preferably also comprises a series of tabs that identify other screens that can be accessed. In screen 400, the status page tab is highlighted.

Figure 5:
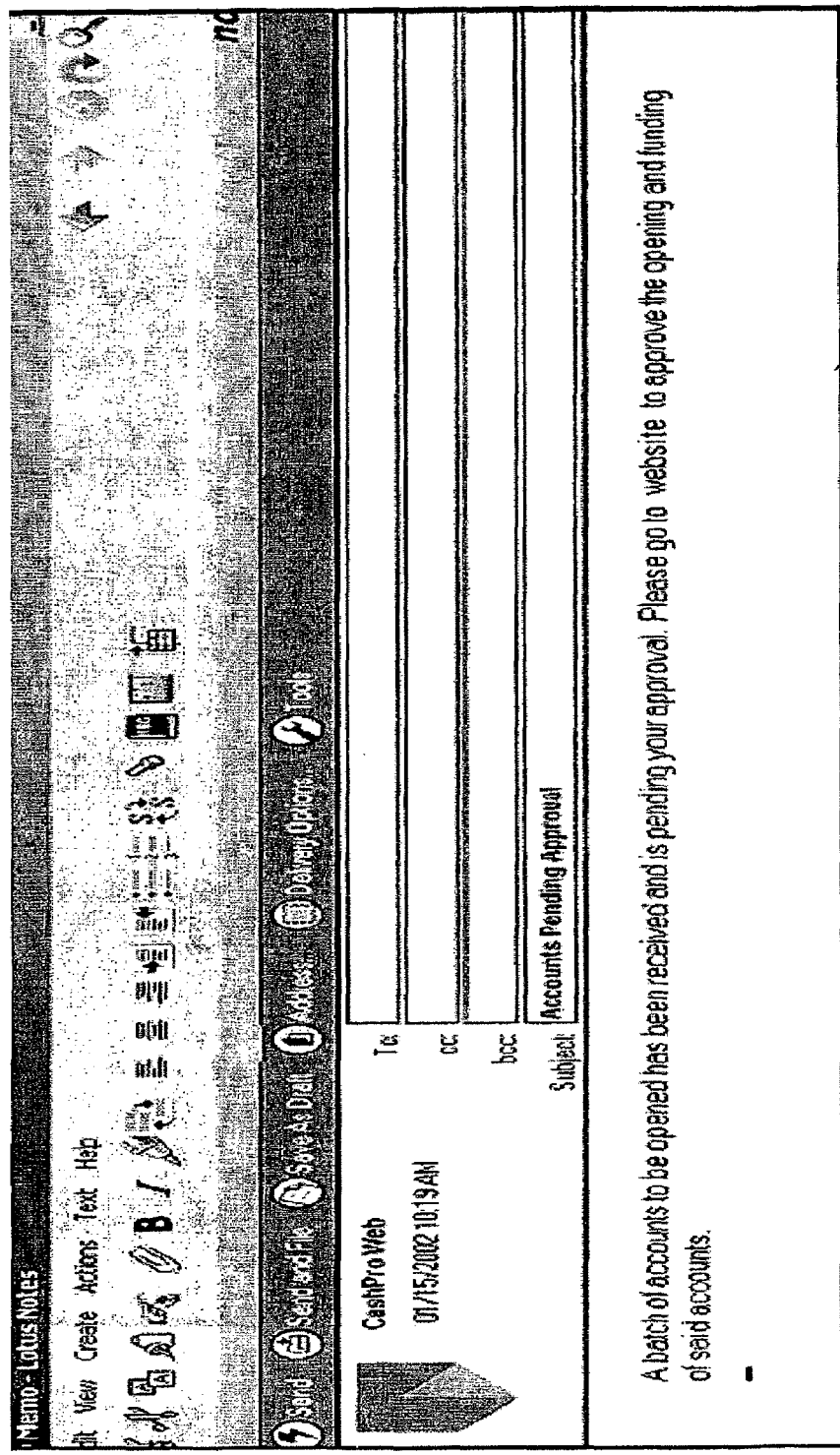

Screen 500 of FIG. 5 is the avenue via which a customer can upload files. As shown, a browse button can be selected to browse customer database 12 to select the appropriate file or files to be uploaded to the bank. Once the desired files have been selected, namely files that designate accounts to be opened, closed, etc., the Upload button on screen 500 is selected causing the files to be transferred to server 16. A batch number is also preferably assigned to each uploaded batch file to facilitate tracking.

Optionally, when the file or files are processed, an email notification is sent to an "approving" agent of the customer. The email indicates that a batch file has been received and is pending approval. The email further states to re-access server 16 to approve the opening and funding of the accounts (or the closing of the accounts and the disbursement of money, as necessary).

Figure 6:
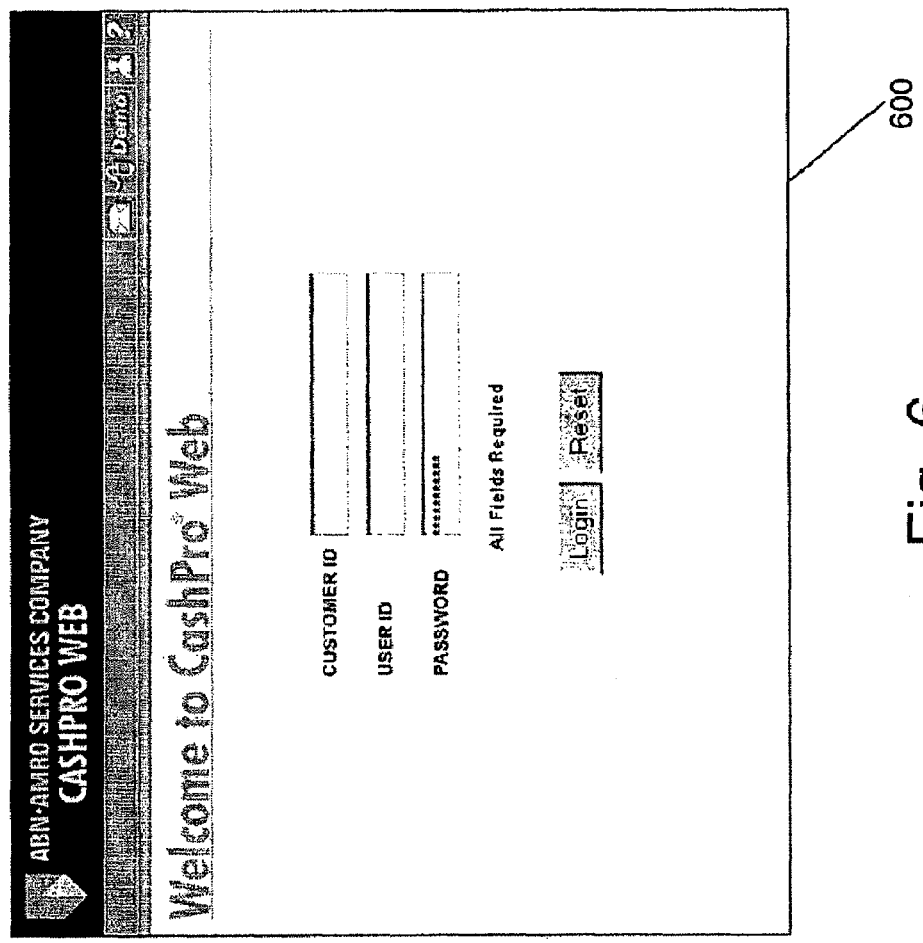

FIG. 6 depicts a web page 600 similar to that of FIG. 3 except that the user ID is different. More specifically, in accordance with the present invention, it is possible that the approving agent is different from the person who was responsible for uploading the account opening and closing information in the first place. Once the approving agent logs in, screen 700 of FIG. 7 is preferably presented to the approving agent (or whoever is operating customer system 10). Screen 700 lists the information that was uploaded in the batch file transfer. As shown, all of these transactions can be selected, deselected or individually selected for approval. Also, as shown, each line item identifies a transaction type (i.e., update, open or close), a date, a deal number, an account number, a batch number, and other details of the transaction. Thus, screen 700 displays for a user all of the unapproved transactions for a particular date. It is preferably also possible to filter the items shown on screen 700 by selecting the filter button near the middle top area of the screen. Filtering can be accomplished on any of the columns as is well known in the relational database arts. When the "Approve" button on the bottom of screen 700 is selected, then all of the transactions for which a check mark was indicated will be acted upon in the appropriate manner. That is, the information is passed to the appropriate back end systems 24 as though the information were being input manually by a bank employee. Accordingly, upon approval, accounts are automatically opened or closed using precisely the same information that was sent to the bank in the first place by the customer.

Figure shows screen 800, which shows to a user the status of one or more batch files that have been uploaded to server 16. This screen indicates whether particular batches have been rejected, completed, are in process, or an error has occurred. An error might occur, for example, if there are insufficient funds in an operating account intended to fund an account to be opened.

FIG. 9 shows screen 900, which displays an account summary for the logged in customer. Account summary screen 900 permits the user to quickly review all of the accounts that have been opened or closed on a given day or period of days. Unlike present day procedures under which a bank representative would have to request from an internal banking officer a status chart of a particular customer's accounts, which would then be sent on to the customer, the customer can now immediately have access to this information through server 16 and customer system 10. In addition, by selecting any one of the accounts in the account # column, screen 910 of FIG. 9A is displayed, giving a user detailed information about the selected account.

Figure 10:
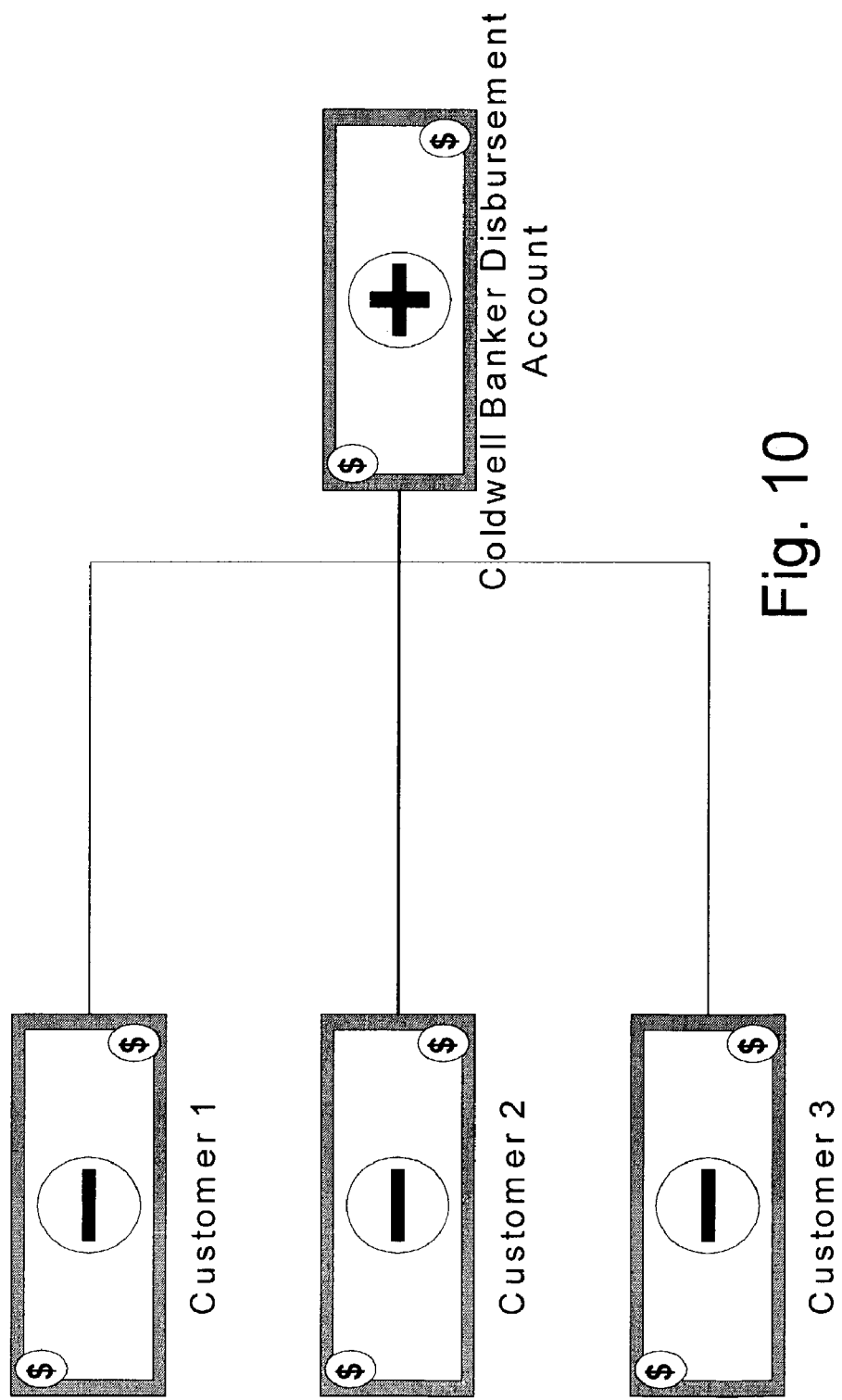

Screen 1000, depicted in FIG. 10, shows how customer system 10 can receive a trial balance report at the click of a button, namely one of the tabs near the top of the screen. Thus, again, in accordance with the present invention, it is possible to completely avoid having to contact bank personnel to obtain information about a customer's accounts.

FIG. 11 shows screen 1100 that can be used to download files. This permits a user to download information electronically directly from a bank, thereby facilitating the possibility of importing the information into a spreadsheet program, or other computer data processing program, as desired.

Figure 12:
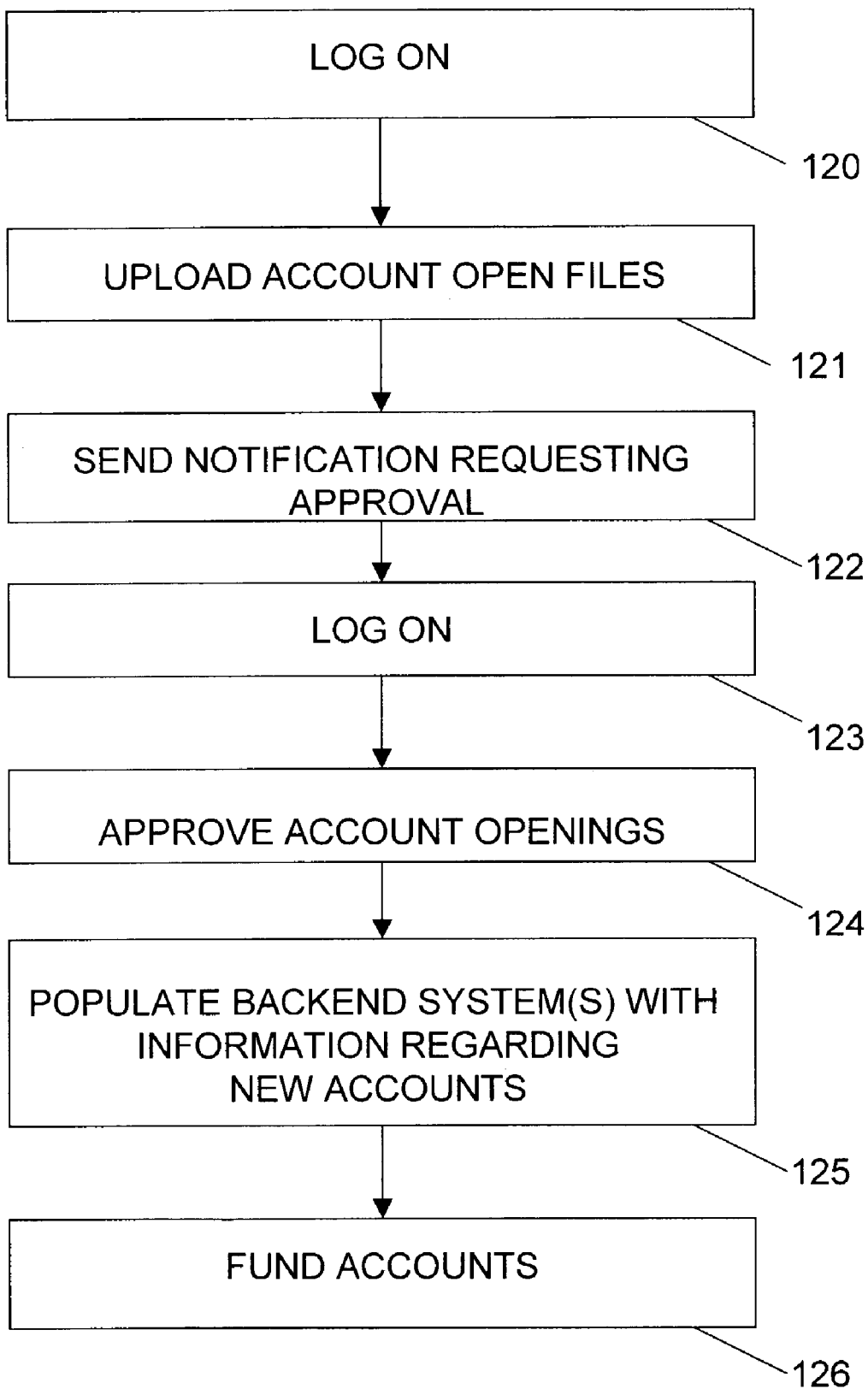
FIGS. 12 and 13 depict exemplary series of steps for practicing aspects of the present invention.
Figure 13:
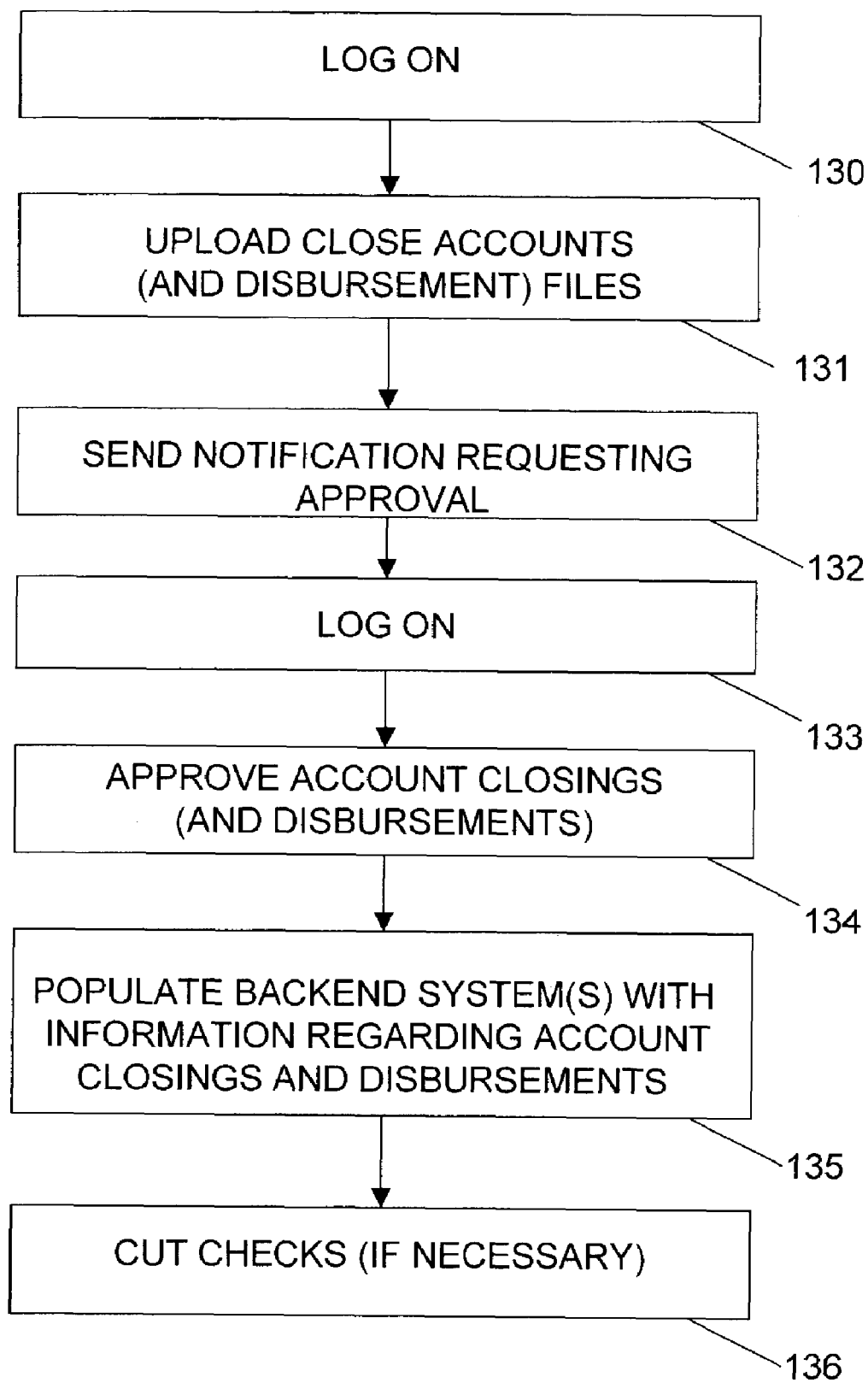

FIGS. 12 and 13 depict exemplary series of steps for practicing aspects of the present invention. FIG. 12 depicts an exemplary series of steps for opening a plurality of accounts in accordance with the present invention. At step 120 a customer logs onto an application running on a server, such as server 16 of FIG. 1. However, those skilled in the art will appreciate that the present invention could be implemented over a dedicated network such that a public network such as the internet is not required.

At step 121, the customer uploads a batch file that contains information for opening one, and preferably several, bank accounts. In a preferred use of the present invention, the bank accounts are escrow accounts that can be used in real estate transactions.

Optionally, upon receipt of the files, a notification, preferably in the form of an email, requesting approval for opening the accounts identified in the file just uploaded is sent to the customer at step 122. This step, in combination with steps 123 and 124 described below, fulfills a dual authorization requirement for transactions of this type.

Upon receipt of the notification sent at step 122, a customer again logs on at step 123 to an application running at server 16, and at step 124 is given the opportunity to approve the account opening requests. Once approval has been received, the information uploaded in the files is used, at step 125, to populate the back end systems 24 of the bank to formally open the desired new accounts. Finally, at step 126, the new accounts that were just opened at step 125 are funded in accordance with the request in the uploaded file(s). In a preferred embodiment of the present invention, funds are transferred from an operating account of the customer such that the entire process of opening new accounts is conducted without human intervention on the bank-side of the transaction. This is a substantial improvement over existing procedures in which bank personnel must be intimately involved in every step of opening and funding new accounts.

FIG. 13 depicts exemplary steps for closing accounts and making disbursements, as necessary, in accordance with the present invention. Steps 130-135 are substantially the same as steps 120-125 described with respect to FIG. 12, but instead of uploading files describing accounts to be opened, steps 131 and 134 involve uploading information directed to closing accounts and making disbursements, and approving account closings and disbursements, respectively. Likewise, step 135 involves populating a bank's bank end system 24 with information regarding account closings and disbursements. Finally, in step 136, checks are cut, as necessary, if disbursements are to be made. Thus, like an account opening process, the account closing process removes the necessity for having bank employees involved in the details of the transaction.

While FIGS. 12 and 13 are described separately, a single batch file uploaded to server 16 might very well include both instructions/requests for opening AND closing accounts (or updating account information). The discussion of FIGS. 12 and 13 has been separated only to simplify the discussion of the features of the features of the present invention.

As will be appreciated by those skilled in the art, by having the ultimate customer (e.g., law office, realtor) input all of the information for account openings and closings directly into a bank's back end system that then formally opens and closes the accounts, the possibility for errors committed by others associated with the process is eliminated. Moreover, it is possible to significantly reduce the number of bank employees involved in bulk account management, thereby reducing costs and increasing efficiency. In addition, the processes described herein are easily scalable by adding additional customers through the registration process described with respect to FIG. 2, and by providing sufficient server capability for server 16 to handle additional customers and/or larger files.

As a by product of the ability to handle significantly larger numbers of account openings and closings, it is also possible for a bank to maintain higher operating balances for individual customers. As a result, revenues accruing to the bank increase thereby further increasing the value of the present invention.

Finally, although a batch upload process has been described, the present invention also preferably provides direct input of account opening, closing and updating information. Though not shown as a separate screen in the drawings, those skilled in the art can appreciate that a separate screen could be provided that allowed users to directly complete a HTTP form presented to them to open/close/update a single or even multiple accounts, thereby avoiding having to generate batch files for uploading.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of managing bulk bank accounts associated with a plurality of real estate transactions, comprising:
receiving from a real estate office instructions to open a set of new escrow accounts, close a first set of open escrow accounts, and update a second set of open escrow accounts, associated with real estate transactions for a plurality of clients of the real estate office, the instructions being received electronically, at a financial institution, together in a batch file;
automatically populating a bank account management system, by the financial institution, with batch processing information provided in the instructions;
automatically establishing the set of new escrow accounts consistent with the batch processing information;
automatically closing the first set of open escrow accounts consistent with the batch processing information;
automatically updating the second set of open escrow accounts consistent with the batch processing information;
funding the set of new escrow accounts with funds from an operating account belonging to the real estate office;
automatically causing checks to be cut, the checks being in an amount due to a client of the real estate office; and
generating a batch status report and making the batch status report available to the real estate office directly.

2. The method of claim 1, further comprising sending a notification requesting approval to open the set of new escrow accounts, to close the first set of open escrow accounts, and to update the second set of open escrow accounts.

3. The method of claim 1, further comprising receiving approval to open the set of new escrow accounts, to update the second set of open bank accounts and to close the first set of open escrow accounts.

4. The method of claim 3, wherein the notification is in the form of an email message.

5. The method of claim 1, further comprising registering the real estate office prior to receiving instructions.

6. The method of claim 1, further comprising generating an escrow account summary report and making the escrow account summary report available to the real estate office electronically.

7. The method of claim 1, further comprising generating a trial balance report and making the trial balance report available to the real estate office electronically.

8. The method of claim 1, further comprising receiving log on information from the real estate office.

* * * * *